United States Patent [19]

Copham

[11] Patent Number: 5,085,417
[45] Date of Patent: Feb. 4, 1992

[54] METHOD OF ENCODING STACKS OF PRINTED MATERIAL

[75] Inventor: David L. Copham, Forest Lake, Minn.

[73] Assignee: Liberty Share Draft and Check Printers, Inc., Mounds View, Minn.

[21] Appl. No.: 444,285

[22] Filed: Dec. 1, 1991

[51] Int. Cl.⁵ .............................................. B41F 13/54
[52] U.S. Cl. ...................................... 270/1.1; 270/52; 270/53
[58] Field of Search ................... 270/1.1, 21.1, 52, 53, 270/58

[56] References Cited

U.S. PATENT DOCUMENTS

| | | | |
|---|---|---|---|
| 2,946,281 | 7/1960 | Sohn | 101/227 |
| 3,822,876 | 7/1974 | Frain | 270/1.1 |
| 3,988,015 | 10/1976 | Scantlin | 270/1.1 |
| 4,448,127 | 5/1984 | Frain | 270/1.1 |
| 4,463,677 | 8/1984 | Kuehfess | 270/1.1 |

FOREIGN PATENT DOCUMENTS 2542259  9/1984  France .
133865  5/1989  Japan .................................. 270/1.1

Primary Examiner—Edward K. Look
Assistant Examiner—Therese M. Newholm
Attorney, Agent, or Firm—Kinney & Lange

[57] ABSTRACT

A method of forming a coded image with the edges of a plurality of stacked pages is disclosed. The method includes defining a unique identification code for a plurality of defined areas on a sheet of paper, and for printing each identification code onto each area, the identification code being in contact with a boundary between each area. A method of cutting the sheet along each boundary to form blanks having a coded edge, and stacking a number of sheets to form a stack with an edge bearing a coded image formed from a number of coded edges is also disclosed.

24 Claims, 4 Drawing Sheets

1

METHOD OF ENCODING STACKS OF PRINTED MATERIAL

BACKGROUND OF THE INVENTION

The present invention relates to the printing of blank forms. In particular, it relates to a method of coding the edge of a stack of form blanks.

Specialty printers are often faced with the task of rapidly processing large numbers of small volume orders of printed material. For instance, printers of checks and share drafts are normally required to print personalized data in lots of 500 or 1,000 blanks for each order. It is common to print a number of orders simultaneously on the same printing press. Since many orders are processed together, it is difficult to keep the orders separate so that each customer receives only his or her own personalized checks. For the purposes of this specification, checks and share drafts are embraced by the term check.

Personalized check documents are prepared by first printing standardized information and background patterns onto paper. The printed paper is cut into sheets which are commonly referred to as base stock. Typically, a sheet of base stock for checks is 15 inches by 18 inches and is printed with fifteen checks (i.e. fifteen blanks). Each blank contains the background and standardized information for a particular check.

Typically, each check has a long edge and a short edge with five check blanks being printed along the length of the base stock and three check blanks printed across the width. The base stock can be printed in a variety of colors, patterns, etc., and often has background designs printed on the front of each blank such as scenery, wild life, and the like.

In addition to the background patterns, check blanks often have border patterns, and a plurality of lines positioned parallel to the long direction of the check for inserting a date, the name of the payee, a dollar amount, the payor's signature, and other miscellaneous information. Because subsequent cutting steps are not normally very precise, it is common to offset the border patterns slightly toward the center of the blank such that portions of the border patterns are not accidentally cut off.

Each blank on the sheet of base stock may be scored with a cutter near the edge which will later be bound to provide for easy removal of each check blank from the checkbook. Checkbooks are most often bound along the top edge. The sheets of base stock containing the blanks and scoring are stacked and stored for further processing steps.

Custom check printers either print base stock or purchase base stock from suppliers. The custom check printer adds information to the base stock such as customer name, address, telephone number, drivers license number, bank name, bank address, and account numbers, for example. In order to process an order, the custom check printer arranges the printing plate on the printing press to simultaneously process several orders at once. For example, a printing plate may be set up to print fifteen separate orders onto each sheet of base stock, having fifteen check blanks per sheet.

Checkbooks normally have between about 20 and about 40 checks per book, with twenty-five sheets being most common. Therefore, in an order of 500 checks, the custom check printer prints 500 sheets of base stock, with information for one order on one position on the printing plate. The printer forms a stack, cuts the stack into smaller stacks of individual check blanks and binds the stacks into twenty separate books of twenty-five checks each. (Checkbooks also have a plurality of deposit slips in the rear of the book. Other checkbooks have duplicate blanks following each check blank.)

At this point, the custom check printer has fifteen separate stacks of orders of twenty books, or a total of 300 books for filling the fifteen orders. Before packaging the individual orders and shipping the orders back to the customer, it is necessary to verify that each book in the stack belongs to the same order.

Quality control inspectors examine one or more pages in each checkbook to verify that each book belongs to the same order. The inspector looks at the customer name and the account numbers printed in each book. This process is tedious and is subject to human error.

It would be desirable to develop a method of rapidly and accurately inspecting an order of checkbooks to verify that each book in an order bears the same personalized information.

SUMMARY OF THE INVENTION

The present invention includes a method of printing an identification code onto a number of defined areas on a sheet of paper. Each identification code contacts a boundary between defined areas or an edge of the sheet. Every identification code on the sheet is unique to a selected area of the sheet. A number of sheets are printed bearing the identification code. Individualized information is then printed onto each area forming a plurality of blank patterns on each sheet. A quantity of sheets bearing blank patterns are printed, stacked, and cut along a boundary between adjacent blank patterns, forming stacks of blanks. At least one edge on each stack of blanks bears a coded image formed by the identification codes printed on the blanks which form the stack of blanks.

DETAILED DESCRIPTION OF THE PREFERRED EMBODIMENTS

The present invention provides a method of forming an identification code onto the edge of a stack of printed blanks which, in turn, provides a quick, visual identification of the content of those blanks without having to inspect the individual pages.

Figure 1:
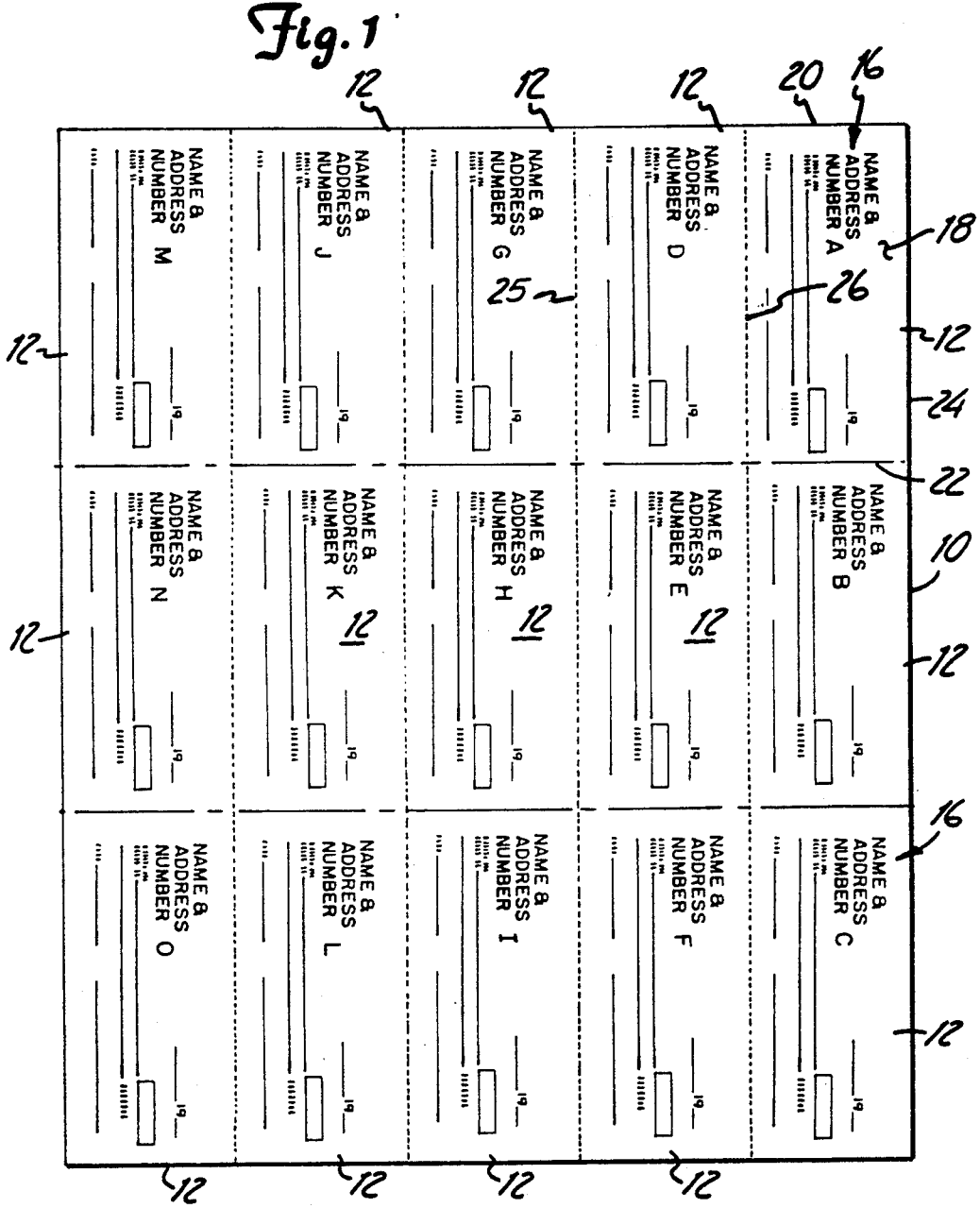
FIG. 1 is a plan view of the front side of a sheet of base stock used in forming checkbooks having individualized customer information printed on each check.

FIG. 1 is a top plan view of sheet of base stock 10 onto which is printed a plurality of blanks 12 each comprising a plurality of markings. For example, FIG. 1 illustrates a sheet of base stock 10 containing fifteen blanks 12 The markings may include a line for inserting the date the check is written, a box for inserting the amount of the check, a line for writing the name of the payee, a line for writing out the amount of the check in longhand, a line for the payor to sign the check and a line for miscellaneous information, as desired. Although the blanks 12 of the embodiment described herein are check or share draft blanks, it is to be understood that the invention contemplates identifying the contents of any printed books, for example, books of business forms, lottery ticket books, sports event ticket books, concert ticket books and other printed materials. The present invention is not limited to sheets of base stock bearing fifteen blanks.

In the described embodiment, the blanks 12 may be printed with background designs (not shown). For example, a pattern known in the check printing industry as "Security Blue" and having a light blue background and a plurality of subtle darker blue wavelike patterns imprinted on the lighter blue background may be employed. In addition to a colored background, the border pattern (also not shown) is slightly inset from the outer boundary of each blank.

In the preferred embodiment, individualized data 16 is also printed on the front 18 of the base stock 10 and includes information such as the name, address, account number and bank of the payor. Preferably, the individualized data 16 and the markings are printed after the design is printed. However, the markings and the individualized data 16 may be printed simultaneously.

Each blank pattern 12 has a left boundary 20, a right boundary 22, a top boundary 24 and a bottom boundary 26 as viewed from the front 18 of the base stock 10. Boundaries 20, 22, 24 and 26 form edges when the base stock 10 is severed and cut into individual blanks 12.

Positions A-O identify a selected area on the base stock defined by each blank 12. A-O are indicated generally by reference characters 30. Each reference character 30 also corresponds to a position on the printing plate. The positions A-O on the base stock 10 are arranged such that the position A is located on the top left blank as viewed from the front 18. Position B is located to the right of A. Each blank 12 in a row is lettered from left to right before the top blank in the next column is labelled. For example, the blanks along the top row are labelled A, B, and C respectively.

Figure 3:
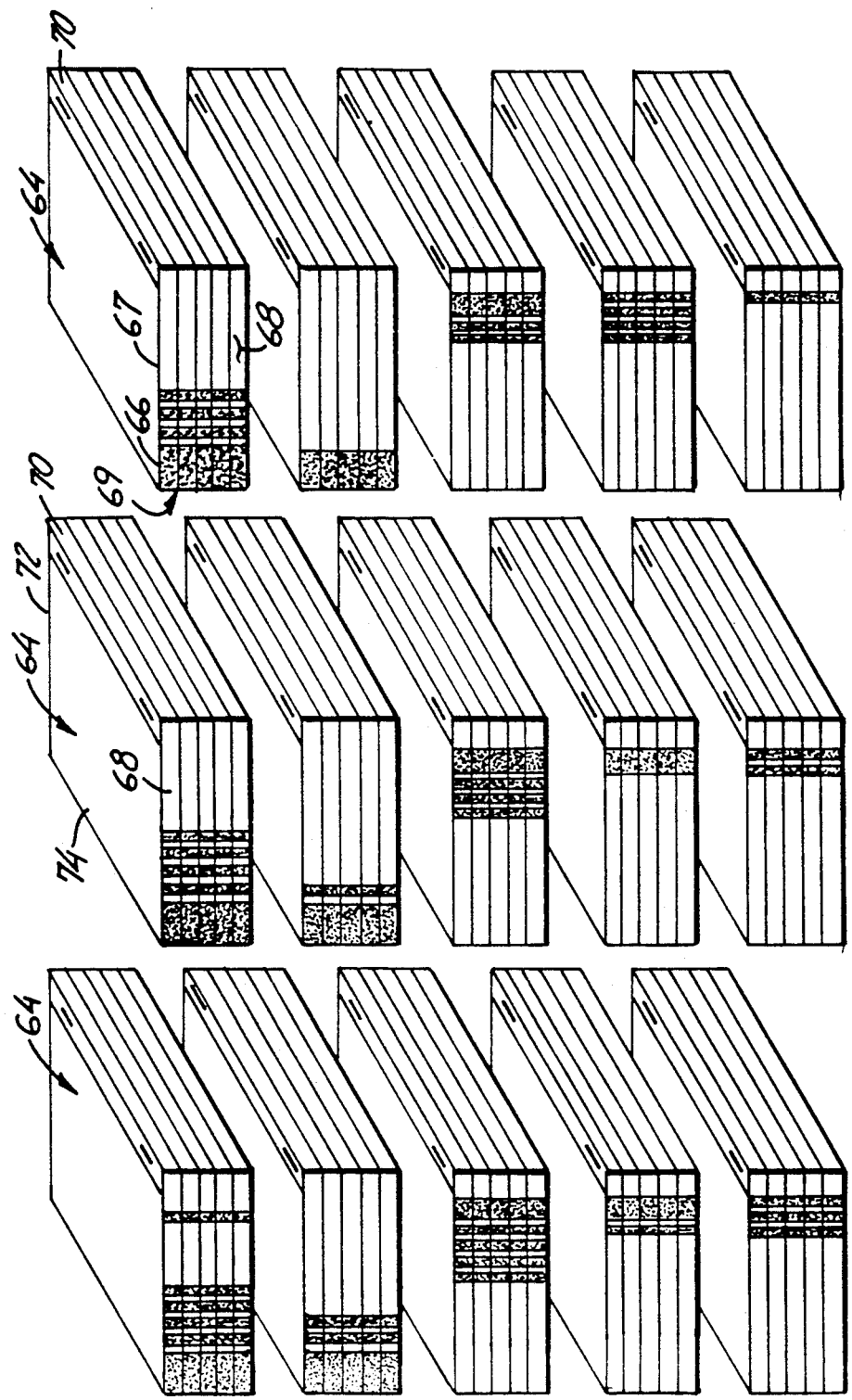
FIG. 3 is a perspective view of fifteen stacks of checks bearing the coded images of the present invention.

Each sheet of base stock 10 is scored slightly below the boundary which eventually forms the bound edge of the stack. In the preferred embodiment, the top edge 70 (as shown in FIG. 3) of a plurality of blanks is bound, and a scoring line 25 is located just below the binding. The scoring line 25 includes a plurality of intermittent cuts which allows for easy removal of a check blank 12 from a bound book of check blanks.

Figure 2:
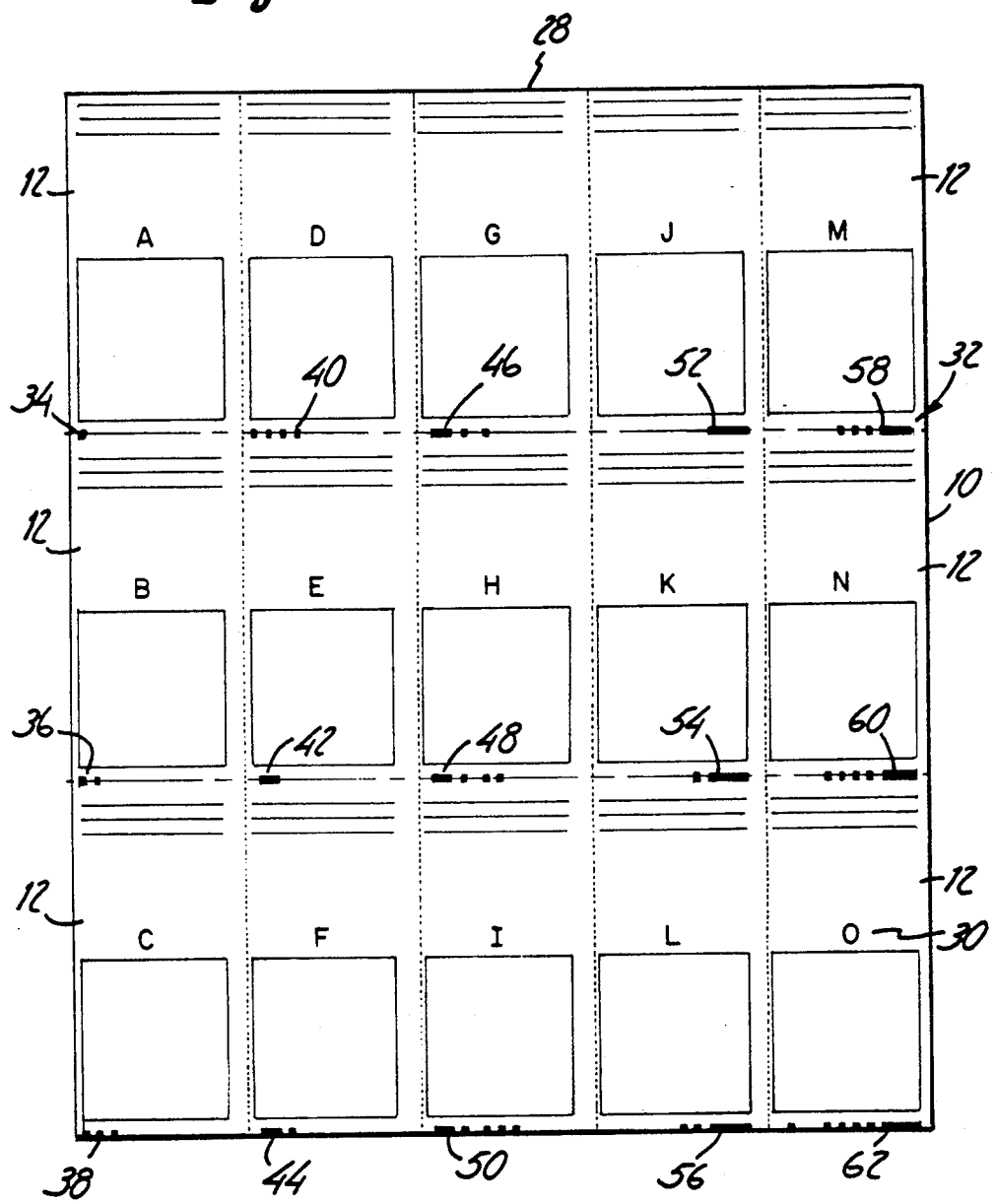
FIG. 2 is a plan view of the back side of a sheet of printed base stock.

FIG. 2 illustrates the back 28 of a sheet of base stock 10 of the preferred embodiment of the present invention. Each blank 12 has a unique identifying code 32 located at the right boundary 22. A "unique identifying code" for purposes of this invention is a code of a size and shape as it appears on a selected edge of a stack of blanks and which corresponds only to one defined area on the sheet of base stock. In the preferred embodiment, each identifying code intersects the boundary between two adjacent blanks or intersects an edge of the sheet. An identification code which is a mirror image of the "unique identifying code" appears on the adjacent edge of the adjacent blank. A stack of pages bearing the mirror image identifying code forms a coded image which is the mirror image of the coded image formed from a stack of sheets bearing the "unique identifying code."

In the preferred embodiment, the identifying code 32 is printed on the back 28 of each blank 12. In another preferred embodiment, the identifying code 32 is printed on the front 18 along the right boundary 22. In still other embodiments, the identifying code 32 is printed along the left boundary 20, the top boundary 24 or the bottom boundary 26, on either the front 18 (shown in FIG. 1) or the back 28.

In the preferred embodiment, the identifying code 32 intersects the boundary between two adjacent blanks 12 where a left boundary 20 of a first blank 12 is adjacent to a right boundary 22 of a second blank 12. Each identifying code 32 includes a plurality of rectangular shaped marks, together forming a bar code which indicates the location where the corresponding blank 12 was printed on the printing plate (not shown) and the location of the blank 12 on the sheet of base stock 10. The base stock 10 for printing checks is segmented into fifteen blanks, and there are fifteen unique identifying codes 32, each different than the others. Although identifying codes 32 are present on both the right boundary 22 and left boundary 20 of each blank 12, the identification codes are read from the right edge 68 only (shown in FIG. 3).

The identifying codes 32 in the preferred embodiment are made up of a quantity of individual identification codes, one on each individual blank 12. A single narrow mark forms the identification code 34 on the base stock 10 at a first position A. Two spaced narrow marks forming identification code 36 are located at position B, three equally spaced narrow marks forming the identification code 38 are located at position C, and four equally spaced narrow marks form an identification code 40 at position D.

Beginning with position E, a medium width mark forms the identification code 42 designating a fifth position. Position F has a medium width mark followed by a narrow mark on the right of the medium width mark forming the identification code 44.

Position G, which is the seventh position is identified by one medium width mark, followed by two narrow marks, to form an identification code 46. Position H has one medium width mark followed by three narrow marks forming the identification code 48. Similarly, position I has four narrow marks following a medium width mark, forming identification code 50.

Position J, which is the tenth position on the base stock 10 is designated by using a wide mark which forms identification code 52. The wide mark in each identifying code 32 indicates a position which is at least tenth in line from the top left corner of the base stock 10, lettering across each row as viewed from the front 18. Position K, has a single narrow mark, followed by a wide mark which indicates the eleventh position, as indicated by identification code 54. The narrow marks appearing in combination with the wide marks are placed to the left of the wide mark instead of to the right so that positions between F and I (the sixth through ninth positions) are not mistaken for positions between K through O (the eleventh through fifteenth positions).

Position L has an identification code 56 formed by two narrow marks followed by a wide mark which indicates the twelfth position on the base stock 10. Position M has an identification code 58 formed from three narrow, equally spaced marks followed by a wide mark which indicates that position M is the thirteenth position from the top, left corner of the base stock 10 as viewed from the back 28.

Position N has an identification code 60 formed from four narrow, equally spaced marks followed by a wide mark. Position 0 is the last position on the base stock, and has an identification code 62 which includes a narrow mark, which is followed by a wide space, then four equally spaced narrow marks, and is then followed by a wide mark.

In another embodiment of the present invention, the identifying codes 32 are arranged in order to be inspected from the left edge (boundary 20) of each blank 12. The identifying codes 32 are positioned on the base stock 10 such that the outermost edges of the identifying code 32 come into contact with the boundary between individual blanks 12. Although this method is less preferred than forming identifying codes 32 which intersect the boundary between adjacent blanks 12, it is an acceptable method of forming a coded image with the edges of a stack of blanks 12. It is difficult to precisely align the paper in the cutter to sever the base stock in a precise location. Therefore, forming a coded image which contacts the boundary between blanks rather than intersects the boundary has the disadvantage of failing to place an identifying code 32 on the edges of some of the pages. If pages are not precisely cut along the boundary between blanks, the edge of the page is not coded.

After the base stock has been printed, the next step in forming a checkbook bearing a coded image on one edge of the stacked pages includes arranging a printing plate to print customized information onto the base stock. In the preferred embodiment, the printing plate is arranged to print customized information such as customer name, address, telephone number, bank information, and account information onto each check blank. Each check is also numbered consecutively. Positions A∝O are each arranged to carry information for a separate order. Although each position A-O is arranged to print a separate order, the present invention contemplates duplicating the same customized information at one or more positions.

The method of the present invention is not limited to separating printed materials from different orders. For example, each position A-O may bear the same information, and the method of forming a coded image may be used to later separate printed material from only one position (e.g. position C) if information at that position was misprinted.

Customized checks are typically ordered in individual orders of 500 or 1,000 checks, and have anywhere between 20 and 40 check blanks per book. The checkbooks of the preferred embodiment contain twenty-five blanks each. The checkbook of the preferred embodiment also has a quantity of deposit blanks, which bear an identical identifying code 32 (not shown) to the code appearing on the blanks 12. In another embodiment, each check blank 12 has a carbon copy (not shown). The present invention is not limited to forming stacks of blanks in which each blank 12 in the stack is identical.

In order to process fifteen separate orders of 500 checks each, it is necessary to print the individualized data 16 (as shown in FIG. 1) onto the check base stock 10 at positions A-O and repeat the procedure until 500 sheets of printed base stock 10 are formed.

The next step in filling an order of 500 checks with checkbooks having 25 checks each includes separating the printed base stock 10 into stacks of twenty-five sheets each. The preferred method includes collecting the 500 sheets in stacks of 25 sheets of printed base stock as the base stock exits the printing press.

Next, the blanks are separated by severing the base stock 10 between adjoining top 24 and bottom 26 boundaries of each adjacent blank 12 forming top and bottom edges 25 and 27. This step is accomplished with cutting devices known in the art.

After each stack of base stock 10 is severed along the top and bottom boundaries 24 and 26 (shown in FIG. 1A), 1,000 stacks of twenty-five sheets each are formed, each having three blanks which are joined at the right and left edges 20 and 22 (shorter edges).

The next step in the method of the present invention includes binding each stack along the top boundaries 24 (now edges), adjacent to the scoring lines 25. This binding step is conducted in a manner known in the art. The next step includes severing each stack of blanks between the right boundary 22 and the left boundary 20 by using a conventional cutter, for example.

Each stack of twenty-five sheets of base stock 10 is printed, stacked, cut, bound and recut, and then sorted according to its position indicated by the reference characters 30 on the printing plate. This procedure is repeated nineteen more times until each order comprises twenty books of twenty-five check blanks bearing individualized data 16 (as shown in FIG. 1).

FIG. 3 shows fifteen orders of 125 checks each, segregated after the final cutting step. Although orders typically are for either 500 or 1,000 checks, FIG. 3 is an illustration of fifteen check orders of 125 checks each. Each checkbook 64 in this figure has twenty-five check blanks. Each blank 12 bears an identifying code 32 which contacts the right edge 67 of a blank 12 forming a coded image 66 on the edge 68 of each checkbook 64. A quantity of checkbooks 64 printed at the same location on the base stock 10 when stacked forms a composite coded image 69. By observing the composite coded image 69, it can be easily determined whether or not each checkbook 64 bears the same coded image 69 and therefore whether each book belongs to the same order.

Each consecutive sheet appearing in each checkbook 64 is oriented the same way. The identifying code 32 on each blank 12 is oriented on the same edge 68 of the checkbook 64. Because the identifying code in the preferred embodiment 32 intersects the boundary between adjacent blanks, the edges 67 bearing the identifying code 32 when piled into a stack forms a coded image 66. In the preferred embodiment, the identifying codes 32 are shaped such that the coded image 66 formed on the edge of the checkbook 64 resembles a standard bar code. The present invention contemplates any identifying code 32 of a shape which produces a coded image 66 on the edge 68 of a checkbook 64, or any other stack of blanks.

Because the coded image 66 in the preferred embodiment is formed from a plurality of identifying codes 32 which intersect the boundary between adjacent blanks 12, checkbooks 64 which are produced from adjacent positions having edges 68 and opposite edges (not shown) which were once connected, bear coded images which are the mirror image of each other. For this reason, it is preferred to select an identifying code 32 for each blank 20 of a sufficient size and shape such that the mirror image is not mistaken for a code corresponding to a different position on the printing plate. In practice, forming coded images 38 which are mirror images of the coded images to be inspected does not present a problem because the inspector examines only a selected edge, (e.g., the right edge 68) of each book 64.

Once each checkbook 64 is formed to complete the order, the stack is either inspected in its entirety or split into smaller stacks and inspected in groups. The preferred method of inspecting includes inspecting a stack of five books along the right edge 68. The right edge 68 is easily located by orienting the checkbook 64 so that the binding is at the top edge 70, as viewed from the front of the checkbook 64.

Although the checkbooks in the preferred embodiment are bound along the top edge 70, the present invention contemplates binding the checkbooks at the right edge 68, the left edge 72 or the bottom edge 74. The identifying codes 32 can be printed anywhere on the base stock 10 such that the coded image 66 appears on any edge of the stack.

The inspector has a board (not shown) which includes a position corresponding to each position on the base stock 10 (as shown in FIG. 1). Each position on the board contains personalized information which is to be printed on each check order. By looking at the composite image 69 on the edge of the stack of checkbooks, and by referring to the board, the inspector immediately knows that each book in the order is the same, and also that the content of each book is the same as the information appearing on the board.

Figure 4:
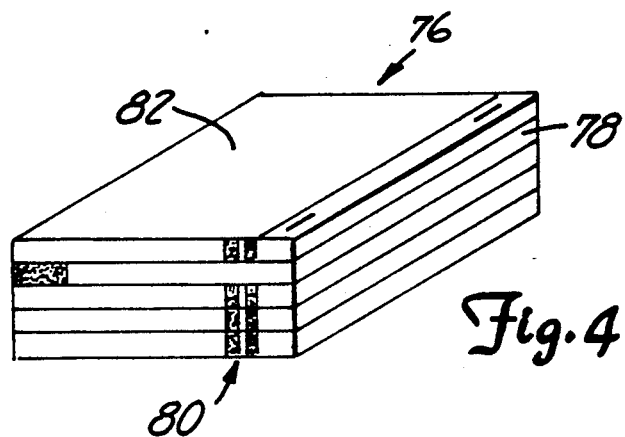
FIG. 4 is a perspective view of an order of five books of checks marked with the coded image of the present invention including one book bearing a different coded image.

FIG. 4 illustrates a stack of checkbooks 76 in which the second book from the top 78 did not originate from the same position on the printing plate as the remaining books. As can be seen from this example, by forming a composite coded image 80 with the edges of a stack of blanks 12, each order can be visually inspected very easily and with good accuracy. Inspection of the coded image 80 verifies that the correct information is contained in the book, and eliminates having to actually read a page 82 of any book.

Although the preferred embodiment of the present method includes a visual inspection of each stack of books, the present invention contemplates the use of electronic scanning to detect errors in filling orders, such as a bar code reader. The present invention also contemplates the use of a computer coupled to the bar code reader which compares the bar code to reference information, and determines whether the bar code is valid.

Figure 5:
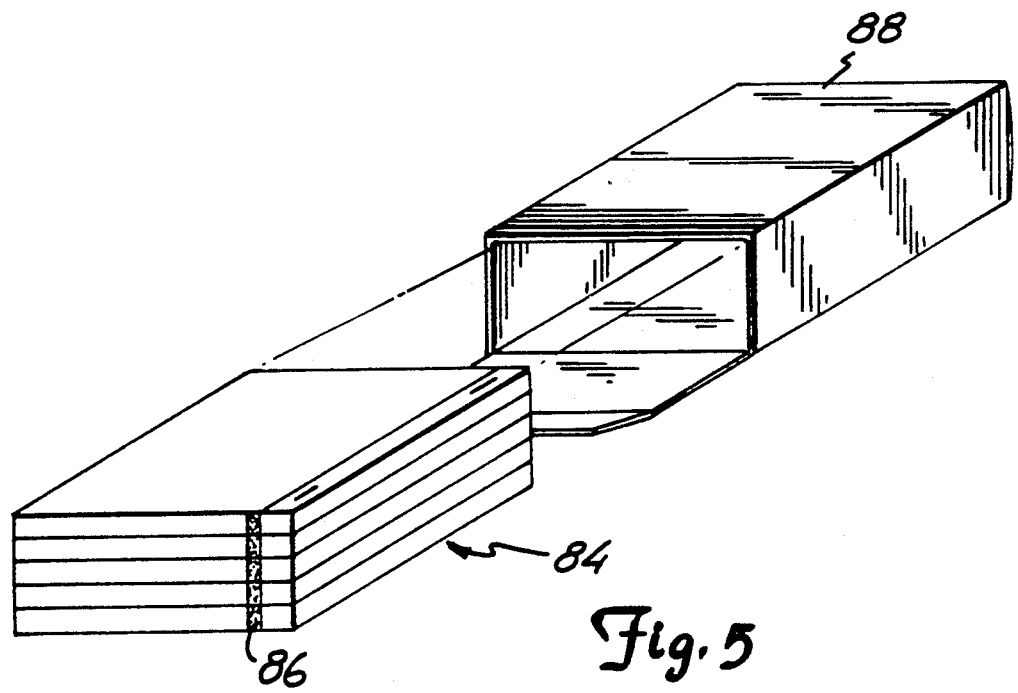
FIG. 5 is a perspective view of an order of checks ready for insertion into a shipping container.

Once each stack 84 as shown in FIG. 5 has been inspected to verify that each coded image 86 is identical, the stack is inserted into a box 88, is labelled and is shipped to the customer.

Although the present invention has been described with reference to preferred embodiments, workers skilled in the art will recognize that changes may be made in form and detail without departing from the spirit and scope of the invention.

What is claimed is:

1. A method of printing an identification code onto a plurality of defined areas of a sheet of paper, multiple printed sheets being stacked and cut into individual stacks with at least one coded edge of each individual stack bearing a coded image formed by printing a unique identification code on each area, the method comprising the steps of:

defining a unique identification code for each of said areas;
    printing each area with the unique identification code defined for that area, the unique identification code of an area being in contact with a boundary or edge of that area;
    forming a stack of sheets; and
    cutting the stack of sheets along each boundary between adjacent areas to form a plurality of individual stacks and forming at least one coded edge on each individual sheet in the stack, wherein the coded image is formed from a plurality of staked coded edges.

2. The method of claim 1 and further comprising:
    inspecting a coded image formed on the edge of each stack.

3. The method of claim 2 and further comprising a step of binding each stack of blanks along an edge.

4. The method of claim 2 wherein each blank is a check blank and further comprising a step of binding each individual stack of blanks along a first edge of the stack to form a checkbook, the coded image being formed along a second edge of the individual stack.

5. The method of claim I wherein the step of printing each area with a unique identification code comprises printing the unique identification code onto a back of each blank.

6. The method of claim wherein the unique identification code comprises at least one substantially rectangular shaped image, having a preselected size, wherein the image formed is a bar code.

7. The method of claim 1 wherein each unique identification code comprises two or more substantially rectangular shaped images, each image spaced from the other, wherein the image formed is a bar code.

8. The method of claim 4 and further comprising a step of forming a stack of checkbooks, with each checkbook in the stack of checkbooks having the same orientation, at least one edge of the stack of checkbooks bearing a composite coded image.

9. The method of claim 8 wherein the inspection step comprises inspecting an edge of the stack of checkbooks bearing the composite coded image formed from a plurality of coded images on the second edge of each checkbook.

10. The method of claim 2 wherein the forming step comprises collecting between 20 and 40 sheets, and piling the sheets into a stack.

11. The method of claim 2 wherein the forming step comprises collecting a plurality of blanks, including one or more styles of blanks.

12. The method of claim 4 wherein each check blank comprises a plurality of lines, and when the check blank is used, information is inserted above at least one of the lines.

13. The method of claim 4 wherein each check blank further comprises personalized information, including a name and a bank account number of an account holder.

14. The method of claim 4 wherein a top edge of the stack of blanks is bound, and the inspection step comprises visually observing a second edge of each checkbook.

15. The method of claim 2 wherein the inspecting step comprises optically scanning the second edge of a checkbook bearing the coded image with an electronic bar code reader.

16. The method of claim 15 wherein the inspecting step further includes determining the validity of the coded image with a computer coupled to a bar code reader.

17. A method of forming a coded image with a plurality of edges of stacked blanks, the method comprising:

defining a plurality of areas of a selected size and shape on a sheet of paper;

printing individualized information onto each area, each area having an identification code unique to that area in contact with a boundary between adjacent areas or an edge of the sheet; and cutting along a boundary between adjacent areas to form a plurality of blanks, each having a coded edge such that a stack of blanks bear a coded image on an edge surface of the stack formed by the coded edges of the blanks in the stack.

18. The method of claim 17 wherein the sheet has a length, width and a blank pattern printed on each area along the length and width, wherein the cutting step comprises cutting the stack between adjacent blank patterns in the direction of the width forming smaller segments, then cutting the smaller segments between adjacent blanks along at least one boundary in the direction of the length forming individual stacks of blanks.

19. The method of claim 18, and further comprising a step of binding the smaller segments along an edge before cutting the smaller segments into individual stacks of blanks.

20. A method of printing an identification code onto a plurality of defined areas of a sheet of paper, multiple printed sheets being stacked and cut into individual stacks with at least one coded edge of each individual stack bearing a bar coded image formed by printing a unique identification code on each area, the method comprising the steps of:

defining a unique identification code for each of said areas; and printing each area with the unique identification code defined for that area, the unique identification code of an area being in contact with a boundary or edge of that area; wherein the unique code comprises at least one substantially rectangular shaped image which forms a part of the bar coded image, which is formed from a plurality of stacked coded edges.

21. A method of forming a checkbook, the method comprising:

printing a plurality of check blanks on each of a plurality of sheets of paper, each check blank having an identification code unique to a location of that check blank on the sheet of paper, the identification code being in contact with an edge of the check blank;

cutting the sheets to form stacks of check blanks; and binding the stacks of check blanks along a first edge to form checkbooks, with the identification code of each check blank of the checkbook forming a coded image along a second edge of the checkbook.

22. The method of claim 21, wherein the coded image is a bar code.

23. The method of claim 21 and further comprising: inspecting the coded image.

24. A checkbook formed by the method of claim 21.

* * * * *

UNITED STATES PATENT AND TRADEMARK OFFICE
CERTIFICATE OF CORRECTION

PATENT NO. : 5,085,417
DATED : February 4, 1992
INVENTOR(S) : David L. Copham

It is certified that error appears in the above-identified patent and that said Letters Patent is hereby corrected as shown below:

Col. 8, line 20, delete "claim I", and insert "claim 1"

Col. 8, line 24, delete "claim", and insert "claim 1"

Signed and Sealed this

Tenth Day of November, 1992

Attest:

DOUGLAS B. COMER

Attesting Officer

Acting Commissioner of Patents and Trademarks